United States Patent [19]
Inbar

[11] Patent Number: 5,838,510
[45] Date of Patent: Nov. 17, 1998

[54] METHOD AND APPARATUS FOR THE MEASUREMENT OF DEFECTS IN MAGNETIC RECORDING DISKS USING A LOGARITHMIC AMPLIFIER

[75] Inventor: Michael Inbar, Santa Barbara, Calif.

[73] Assignee: Phase Metrics, Inc., San Diego, Calif.

[21] Appl. No.: 739,877

[22] Filed: Oct. 31, 1996

[51] Int. Cl.$^6$ .................................................... G11B 5/027
[52] U.S. Cl. ................................ 360/46; 360/31; 324/212
[58] Field of Search .................................. 360/31, 25, 46; 324/210, 212

[56] References Cited

U.S. PATENT DOCUMENTS

| | | | |
|---|---|---|---|
| 3,609,394 | 9/1971 | Lennox | 307/230 |
| 4,881,136 | 11/1989 | Shiraishi et al. | 360/25 |
| 5,121,057 | 6/1992 | Huber et al. | 324/312 |
| 5,256,965 | 10/1993 | Nomura | 324/212 |

*Primary Examiner*—Aristotelis M. Psitos
*Assistant Examiner*—Joseph M. Vann
*Attorney, Agent, or Firm*—Blakely, Sokoloff, Taylor & Zafman

[57] ABSTRACT

The present invention relates to a method and apparatus for the measurement of defects in magnetic recording disks using a logarithmic amplifier. A magnetic head senses a magnetic field of a magnetic disk and creates a read signal having a varying amplitude. The test apparatus has a squarer which receives and squares the read signal. A logarithmic amplifier coupled to the squarer converts the squared signal to a logarithmic signal. The logarithmic signal is filtered by a first filter. A second filter coupled to the logarithmic amplifier provides an average of the peaks of the logarithmic signal. A digital-to-analog converter coupled to the second filter scales the output of the second filter. The test apparatus further comprises a comparator having a first input and a second input, where the first input is coupled to the first filter, and the second input is coupled to the digital-to-analog converter. The comparator provides an output signal in response to receiving a signal from the first filter having an amplitude that is lower than an average of a predetermined number of peak values of the signal, thereby indicating an error in the disk. In another embodiment, the test apparatus is implemented using a rectifier instead of a squarer.

20 Claims, 8 Drawing Sheets

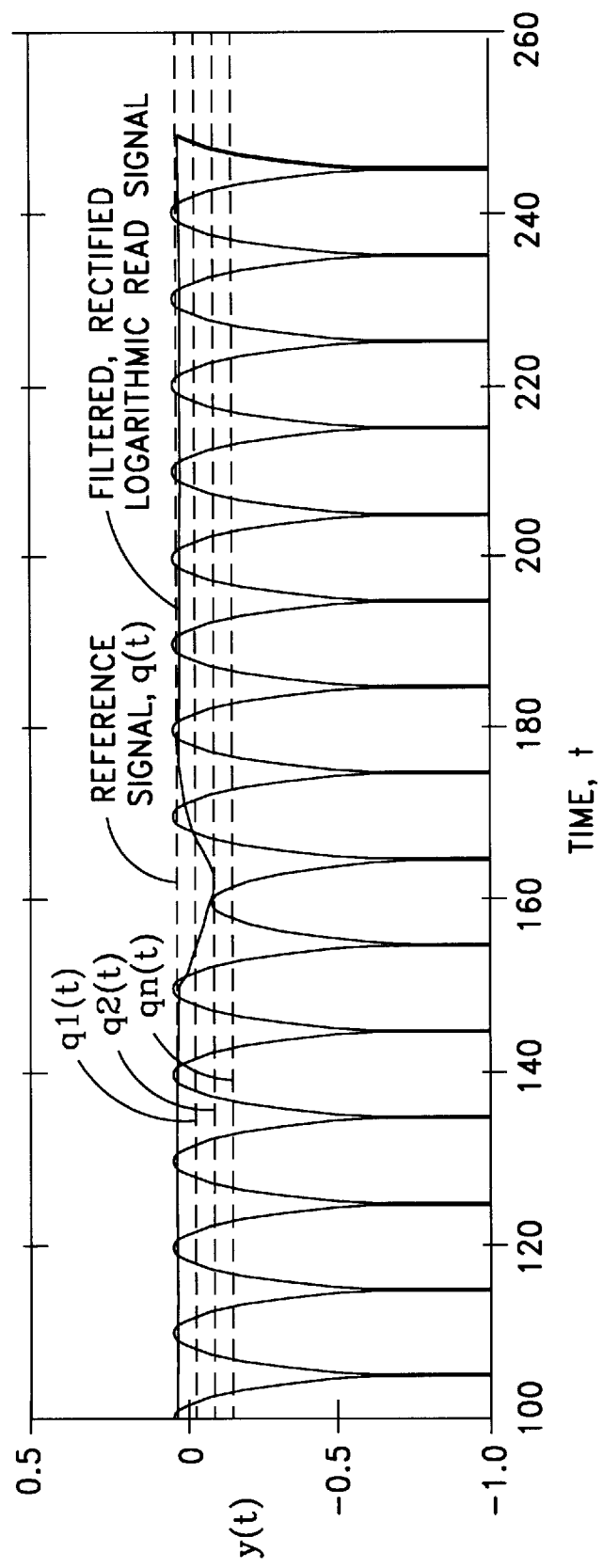

METHOD AND APPARATUS FOR THE MEASUREMENT OF DEFECTS IN MAGNETIC RECORDING DISKS USING A LOGARITHMIC AMPLIFIER

BACKGROUND OF THE INVENTION

1. Field of the Invention

The present invention relates in general to test apparatus and more particularly, to a method and apparatus for the measurement of defects in magnetic recording disks using a logarithmic amplifier.

2. Description of the Related Art

Hard disk drives contain a magnetic disk(s) that magnetically stores information. Materials and processes used in manufacturing the magnetic disk may introduce defects and substandard magnetic characteristic within the disk. For this reason, the disks are typically tested before being assembled to a disk drive unit.

Magnetic disk are typically tested by initially writing data onto the disk and then reading back the data. The data is written and read by a magnetic head which generates a read signal that corresponds to the magnetic field of the disk.

FIG. 1 shows a typical read signal generated by a magnetic head of a disk certification tester. The magnetic head of the disk certification tester generates a read signal that is an alternating current with an amplitude that varies over time. Disk defects are typically detected by analyzing a group of voltage peaks from the read signal. The tester generates a threshold value for each group and compares the peak values with the threshold. If a voltage peak is below the threshold value the tester flags that area of the disk as having a defect or error.

Conventionally, disk defects are often characterized as discrete time events in which the magnitude of a readback signal waveform falls below an established threshold value. For example, the loci of errors may be the extremum points (peaks) of a continuous read back wave form y(t) which fall below an expected value. Specifically, if y(t)=sin (ω*t), the loci of peaks is at ω*t such that:

$$\omega \cdot t = \frac{\pi}{2}, \frac{3\pi}{2}, \ldots, (2 \cdot n + 1)\frac{\pi}{2}, \quad n = 0, 1, 2, \ldots$$

A peak at time T is defined as an error if its amplitude y(T) satisfies the condition:

$$y(T) < \frac{k}{N} \cdot \sum_{i=T-N}^{T} y(i), k < 1 \quad \text{Eqn (1)}$$

where, $$\frac{1}{N} \cdot \sum_{i=T-N}^{T} y(i)$$

is the mean peak amplitude (M(peak)) of the series y(T) and N is the length of integration.

As shown in Eqn (1), the determination that an error has occurred is not based solely on the absolute amplitude of the read back signal, but rather, is dependent on the values of the past N peaks of the signal. For example, consider the signal illustrated in FIG. 2A and/or FIG. 2B. The solid line represents the mean peak value (M(peak)) whereas the dashed line represents the error threshold. An error occurs when a peak of the continuous function falls below the dashed line. The slope of the solid line is a function of the integration length. The solid line is a low passed filtered version of the envelope of the continuous function (a negative going pulse in the illustration above).

Thus, where $$Vout(\text{peak}) < k \int_0^{\text{peak}} [Vout(t)]dt$$

and $$M(\text{peak}) = \int_0^{\text{peak}} [Vout(t)]dt$$

where M(peak) is the mean peak amplitude of the output voltage Vout(t), and k<1, one obtains the following expression:

$$\frac{Vout(\text{peak})}{M(\text{peak})} - k < 0$$

Thus, in the aforementioned convention, the determination of an error state requires the performance of three steps: one division, one subtraction and one sign comparison. Because of the cumulative nature of circuit errors, the number of steps required in the detection of a defect is directly linked to accuracy. Thus, it is desirable to provide a system which can determine the occurrence of an error state in fewer steps.

For a typical signal range in a linear system, the magnitude of the maximum input voltage Vin(max) is ten times that of the minimum input voltage Vin(min). Where the required system resolution is 1%, the dynamic range of the linear system, which is the expected range over which the system must respond to the input, is 1:1000. To accommodate this dynamic range, a particular system will require a large number of bits for processing, or alternatively provide for signal scaling. Generally, the number of bits of a digitizer are inversely related to the device's speed, and directly related to cost and power dissipation.

The sensitivity of the system under discussion is defined as the change in the output voltage, Vout, as the function of the magnitude (depth) of an error, μ, applied to the system's input. Since the measurement is ratiometric in nature, $$0 \leq \frac{Vout}{\mu} \leq 1$$

must hold.

In practice, the range of interest is 0.9–0.1. Unfortunately, compressing the dynamics is often associated with an undesirable decrease in sensitivity.

Accordingly, there is a need in the technology for a method and apparatus for the measurement of defects in magnetic recording disks which requires the performance of fewer steps than existing linear systems. There is also a need in the technology for a disk certifier with a lower dynamic range than existing systems, while maintaining or increasing the resolution of existing systems.

BRIEF SUMMARY OF THE INVENTION

The present invention relates to a method and apparatus for the measurement of defects in magnetic recording disks using a logarithmic amplifier. A magnetic head senses a magnetic field of a magnetic disk and creates a read signal having a varying amplitude. The test apparatus has a squarer which receives and squares the read signal. A logarithmic amplifier coupled to the squarer converts the squared signal to a logarithmic signal. The logarithmic signal is filtered by a first filter. A second filter coupled to the logarithmic amplifier provides an average of the peaks of the logarithmic signal. A digital-to-analog converter coupled to the second filter scales the output of the second filter. The test apparatus further comprises a comparator having a first input and a second input, where the first input is coupled to the first filter, and the second input is coupled to the digital-to-analog converter. The comparator provides an output signal in response to receiving a signal from the first filter having an amplitude that is lower than an average of a predetermined number of peak values of the signal, thereby indicating an error in the disk. In another embodiment, the test apparatus is implemented using a rectifier instead of a squarer.

DESCRIPTION OF THE DRAWINGS

FIG. 7 is a graph showing the reference signals generated by the filter 22 and DAC 26 of FIG. 6, as compared to the filtered, logarithmic, squared, read signal of FIG. 5.

DETAILED DESCRIPTION OF THE INVENTION

The present invention relates to a method and apparatus for the measurement of defects in magnetic recording disks using a logarithmic amplifier.

A. Theory of Operation

1. The Logarithmic Amplifier

The transfer function of the logarithmic amplifier of the present invention may be expressed as follows:

$$[Vout(t)] = \log([Vin^2(t)] + \epsilon)$$

where $\epsilon = \text{constant} > 0$

As discussed earlier, the detection of an error state in a disk certifier may be accomplished by a linear system through the implementation of three steps: one division, one subtraction and one sign comparison of the read signal. The expression representing this process is:

$$\frac{Vout(\text{peak})}{M(\text{peak})} - k < 0$$

The present invention provides for the detection of such an error state by using a logarithmic system instead of a linear system. The expression representing this process is:

$$\log\left(\frac{Vout(\text{peak})}{M(\text{peak})}\right) = \log(Vout(\text{peak})) - \log(M(\text{peak})) < \qquad \text{Eqn (2)}$$
$$\log(k) \rightarrow \log(Vout(\text{peak})) - \log(M(\text{peak})) - \log(k) < 0$$

Thus, as shown in Eqn (2), by utilizing a logarithmic amplifier to certify disks, an error state can be determined by performing three simple steps: two subtractions and one sign comparison.

Another advantage of the logarithmic approach is a compression in the dynamic range of the system. For example, consider a typical signal range where the maximum input voltage is ten times the minimum input voltage, i.e., Vin (max)=10 Vin(min). Further assume that the required system resolution is 1%. As discussed earlier, a linear system requires a dynamic range of 1:1000. The logarithmic system under the same conditions requires a range of only 1:3.

In addition, within the useful range of a disk certifier, the sensitivity of a logarithmic system is greater than that of a linear system, as discussed in detail below. The sensitivity of a linear system y(x) is given by:

$$\frac{d}{dx} y(x) = 1$$

where $0.1 \leq x \leq 0.9$.

The sensitivity of the logarithmic system is given by:

$$\frac{d}{dx} \log(x) = \kappa \cdot \frac{1}{x}$$

where $\kappa = 0.434$

Figure 2A:
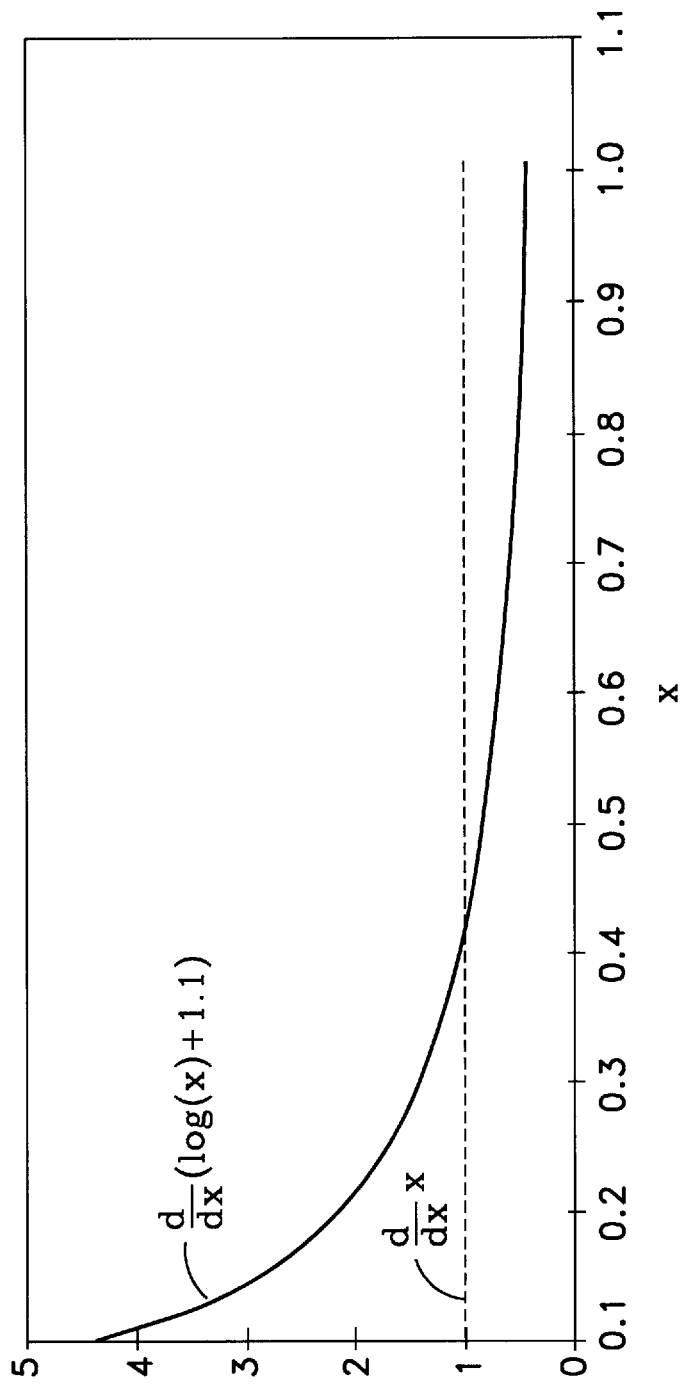
FIG. 2A is a graph illustrating the responses of a linear disk certification system as compared to a logarithmic disk certification system.

FIG. 2A illustrates the curves of both the linear system and the logarithmic system (where the curve of the logarithmic system has been shifted along the y axis for ease of comparison). It can be observed that the sensitivity of the logarithmic system is lower than that of the linear system for all errors smaller than 0.42.

This can be simply resolved by implementing a squaring device, $y^2(t)$ in the logarithmic system, resulting in:

$$\log(y^2(x)) = 2\log(y(x))$$

and $$\frac{d}{dx} 2\log(y(x)) = 2\kappa \frac{1}{x}$$

Figure 2B:
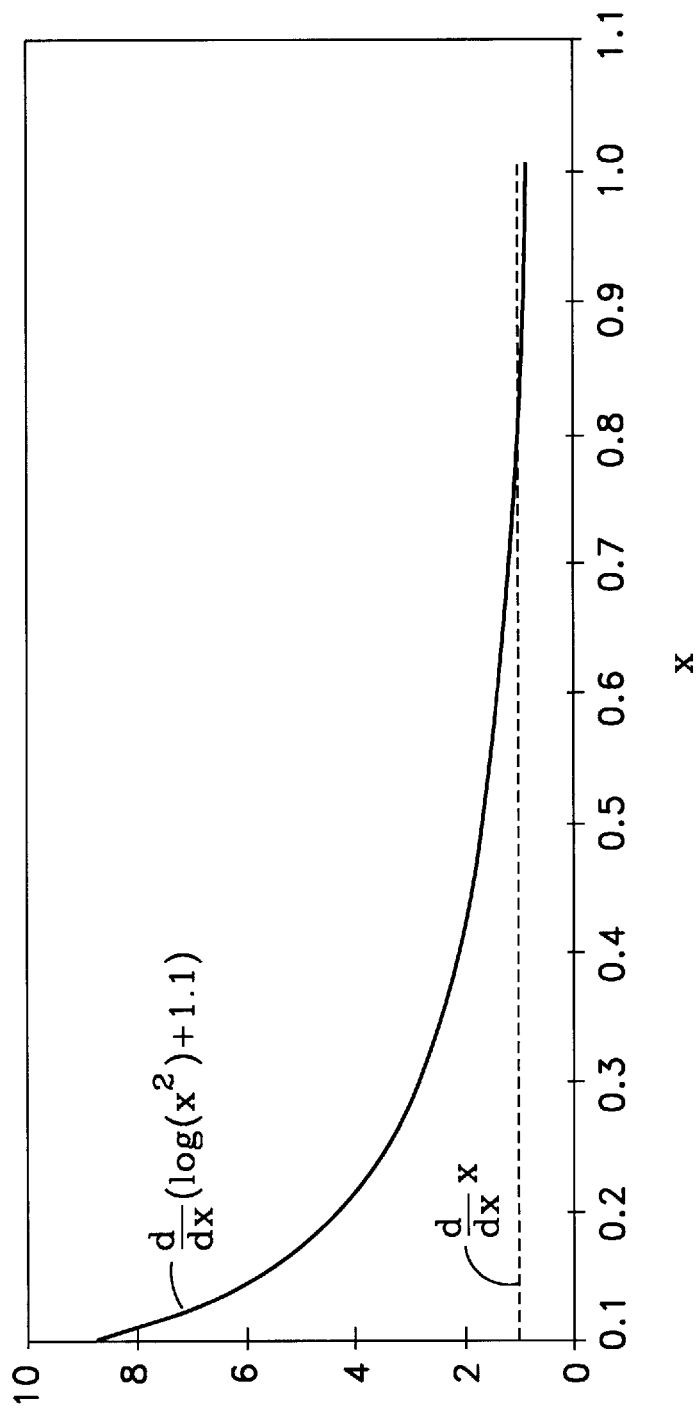
FIG. 2B is a graph illustrating the responses of a linear disk certification system as compared to a logarithmic disk certifications system utilizing a squarer.

FIG. 2B illustrates the response of a logarithmic amplifier which implements a square, as compared to that of a linear amplifier. As shown, the slope of the response of the logarithmic amplifier in the range $0.1 \leq x \leq 1$, where x is the amplitude, is greater than that of a linear system. This indicates that for a given change in input, the logarithmic system provides a larger output than a linear system, and as a result, the logarithmic system is more sensitive than a linear system. Support for these propositions are provided below.

Theorem 1: There exists a threshold $x_0$ such that the sensitivity of a logarithmic system is higher than the sensitivity of a linear system for all $x < x_0$.

The foregoing proposition is established by the following analysis: since a linear system is bipolar, its sensitivity (i.e. the slope of its response) is 1. The slope of the logarithmic system is given by:

$$(s_{log}) = \frac{d}{dx} \log(x^2)$$

$$(s_{log}) = \frac{2}{(x \cdot ln(10))}$$

where $$\frac{1}{ln(10)} = 0.434294$$

Thus, where x is in the range $0.1 \leq x \leq 1$, the slope of the response for the logarithmic system is:

$$8.68 < s(x^2)_{log} \leq 0.868$$

Since the function $s(x)_{log}$ is monotonously decreasing, the sensitivity (slope of the response) of the logarithmic system in the range $0.1 \leq x \leq 0.869$ exceeds 1, the sensitivity (slope of the response) of a linear system.

Theorem 2: The value at which the sensitivities of a linear system and (having a transfer function in the form y(x)) and logarithmic system (having a transfer function in the form log y(x)) become equal is at 86.8% of y(x).

The foregoing proposition is established by the following analysis:

As shown above, in the range $0.1 \leq x \leq 1$, the slope of the response for a logarithmic system is $8.68 < \log y(x) \leq 0.868$. The slope of response for a linear system is 1. Thus, if the value at which the sensitivity of the logarithmic system equals the sensitivity of the linear system is z, then $$\frac{\frac{d}{dx}(\log y^2)}{\frac{dy}{dx}} = z$$

and since $$\frac{d}{dx}(\log y^2) = 0.868$$

and $$\frac{dy}{dx} = 1$$

$$z = 0.868$$

$$\rightarrow 86.8\% \text{ of } y(x)$$

2. Disk certification using a logarithmic amplifier.

Figure 1:
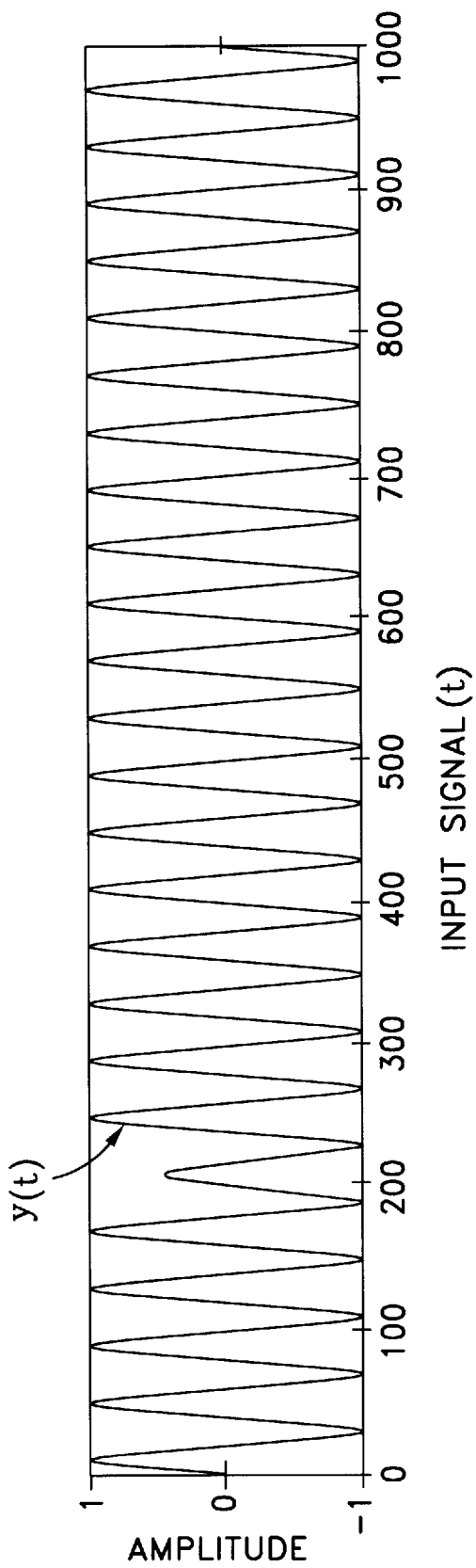
FIG. 1 is a graph showing a read signal generated by a magnetic head used to test a magnetic disk of a hard disk drive of a prior art tester.

The input read back signal to be analyzed by a disk certifier may be expressed by:

$$y(t) = A \cdot \sin(\omega \cdot t) \cdot (1 + m(t))$$

where A is a constant, $\omega$ is the carrier frequency, and m(t) is the modulation function. An example of the signal y(t) is shown in FIG. 1.

Since a logarithmic amplifier cannot process signals that are equal to or less than 0 in amplitude, the read back signal has to be squared. In particular, the function y(t) has to be squared. The squared function r(t) may be expressed as follows:

$$r(t) = [A \cdot [\sin(\omega \cdot t)] \cdot t) \cdot (1 + m(t)]^2$$

Figure 3:
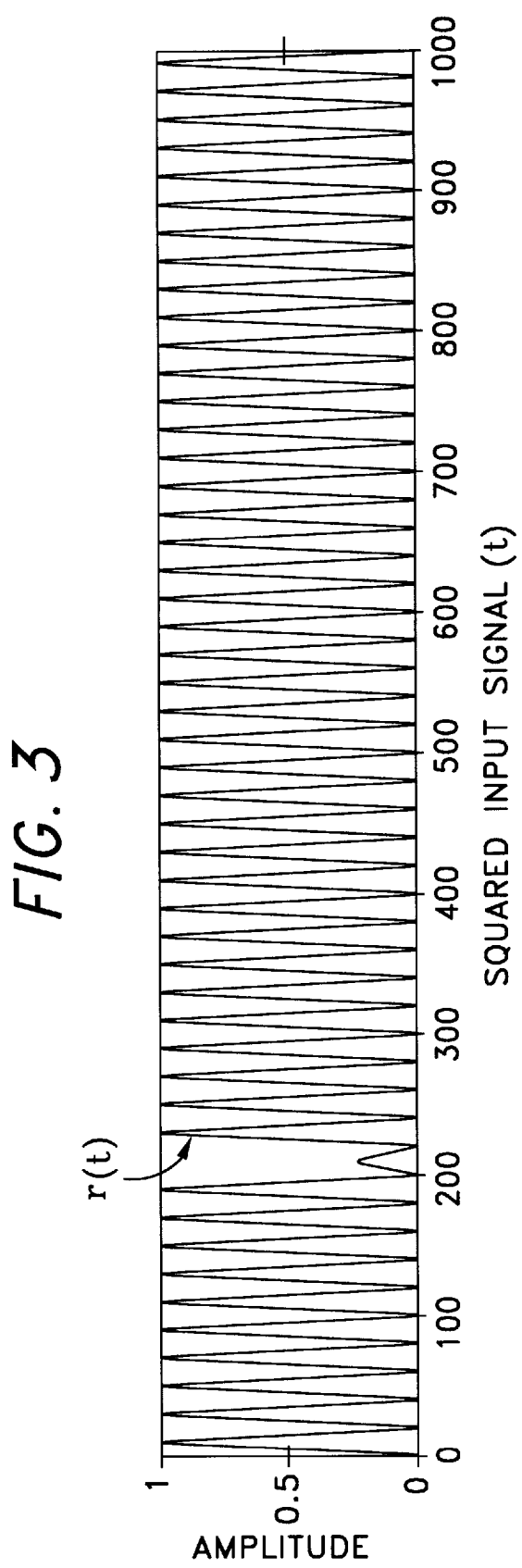
FIG. 3 is a graph showing the read signal of FIG. 1 upon squaring.

The resultant function is shown in FIG. 3.

The function $(\sin(\omega t))^2$ has the following properties: (a) it is periodic in t; (b) its fundamental frequency is $2*\omega$; and (c) it has a DC component of $$\frac{1}{\pi} \cdot \int_0^{\pi} \sin^2(t)dt = \frac{1}{2}.$$

If the function y(t) is filtered by means of a low pass filter with a corner frequency $f_c$ smaller than $2*\omega$, the resulting function will be f(t) where:

$$f(t) = \frac{A}{2} \cdot (1 + m(t))^2$$

Finally, taking the logarithm of f(t) one gets a function l(t), where, $$l(t) = \log(f(t)) = \log\left[\left(\frac{A}{2}\right) \cdot (1 + m(t))^2\right] =$$

$$2\log\left(\frac{A}{2}\right) + 2\log(1 + m(t))$$

Figure 4:
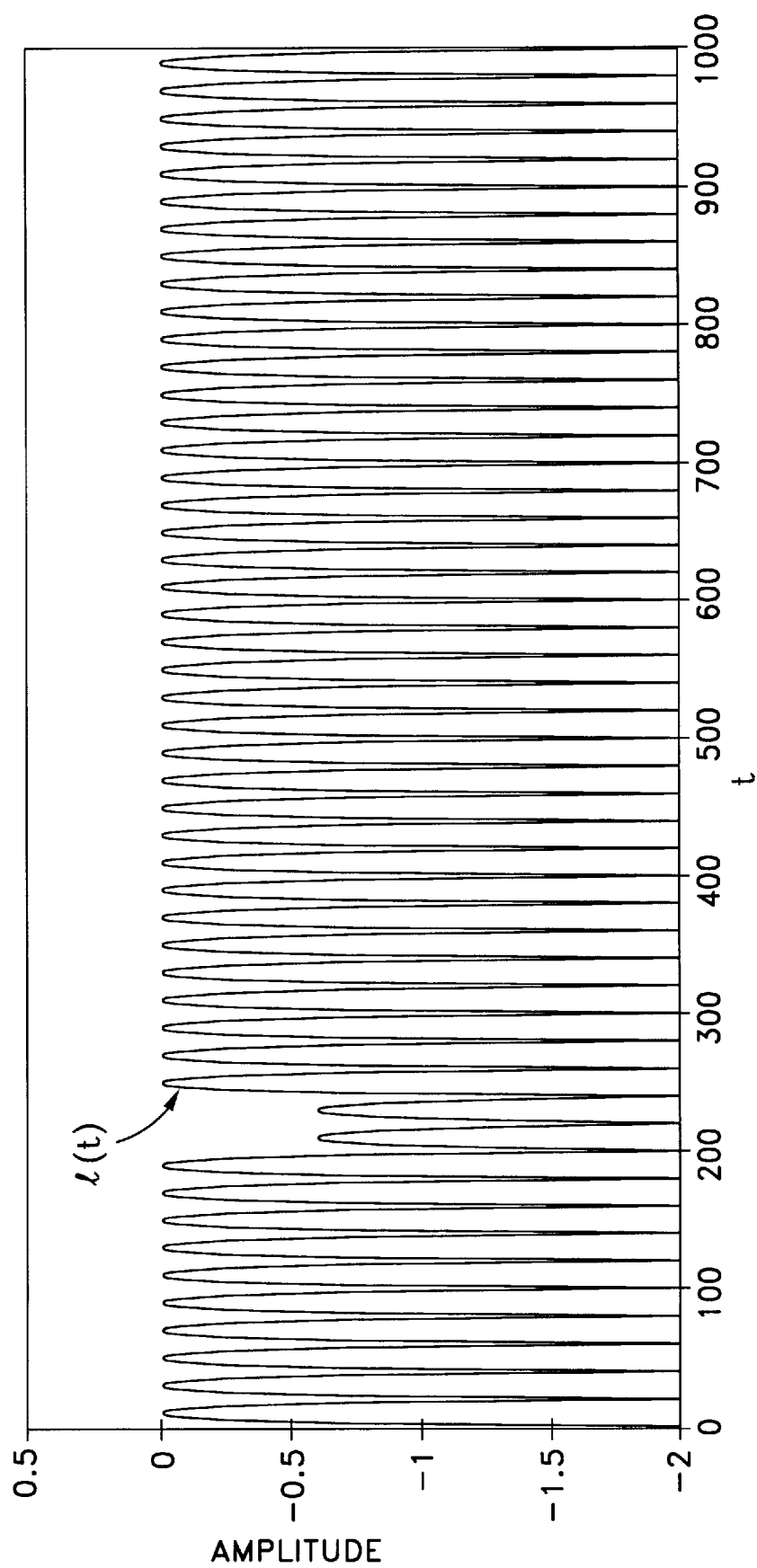
FIG. 4 is a graph showing the squared read signal of FIG. 3 upon conversion to a logarithmic signal.

The signal l(t) is shown in FIG. 4. This result indicates that the use of a logarithmic system provides several advantages over a linear system. These advantages include:

a. The function l(t) has a considerably lower noise bandwidth than the original input y(t). This is so for the following reason. Let the band width of the modulating function m(t) be given by M. Then, the bandwidth occupied by y(t) is $$\Delta f = w + M$$

In contrast, the bandwidth of a linear system l(t) is $f_c$.

b. The dynamic range requirements of the processing electronics in a logarithmic system have been reduced by a logarithmic measure cover that of a linear system. For example, if the input amplitude varies over a range of 1:10, the electronics processing the function y(t) in a conventional certifier had to accommodate the range 1:10. In contrast, a system processing the function l(t) has to respond to a range of only 1:2. In practical terms this implies that such a system will not require an AGC.

c. Since the function l(t) is generated by a squared version of y(t), only half the electronics are required in order to process the signal.

B. Implementation

Figure 6:
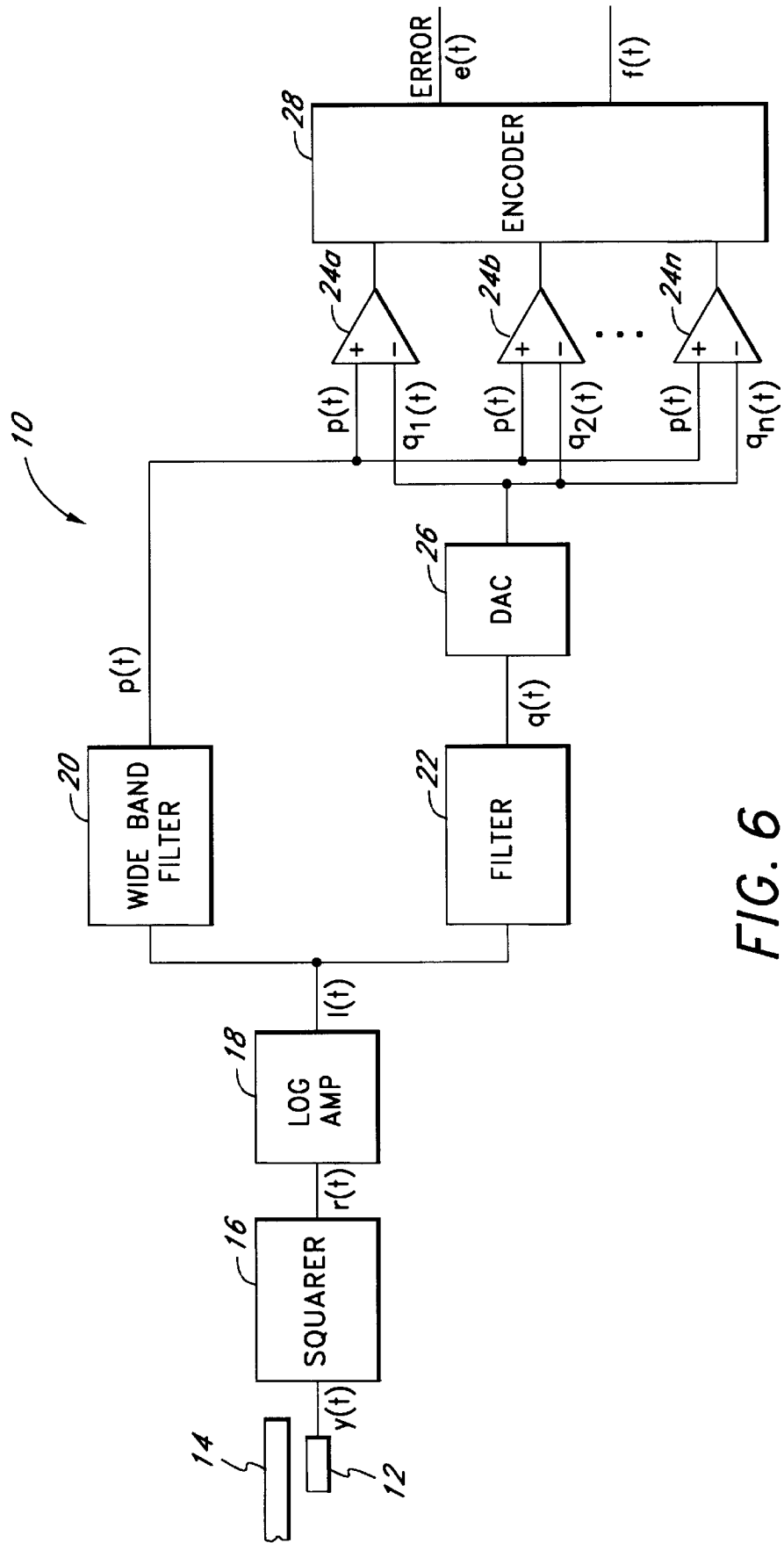
FIG. 6 is a system block diagram of the logarithmic disk certification apparatus of the present invention.

FIG. 6 illustrates one embodiment of the disk certification tester 10 of the present invention. The disk certification tester 10 is coupled to a magnetic head 12 that senses the magnetic field of a magnetic disk 14. The tester 10 is used to detect single or multiple bit errors on the disk 14. The magnetic disk 14 is typically tested by initially writing an alternating current ("AC") signal onto the disk 14 with the magnetic head 12. The head 12 then reads the signal back from the disk 14. When reading the magnetic disk 14, the head 12 generates a read signal that corresponds to the magnetic field of the disk 14. Defects, manufacturing tolerances and other factors may very the amplitude of the signal. The read signal therefore becomes an amplitude modulated signal y(t) as shown in FIG. 1.

The read signal generated by the magnetic head 12 is provided to an input of a squarer 16, which squarers the signal y(t) to provide a squared signal r(t) as shown in FIG. 3. The squared signal r(t) is then provided to a logarithmic amplifier 18. A typical example of the logarithmic amplifier 18 is that produced by Analog Devices under the part designation AD 640. In response, the logarithmic amplifier 18 generates a logarithmic squared signal l(t) (shown in FIG.

Figure 5:
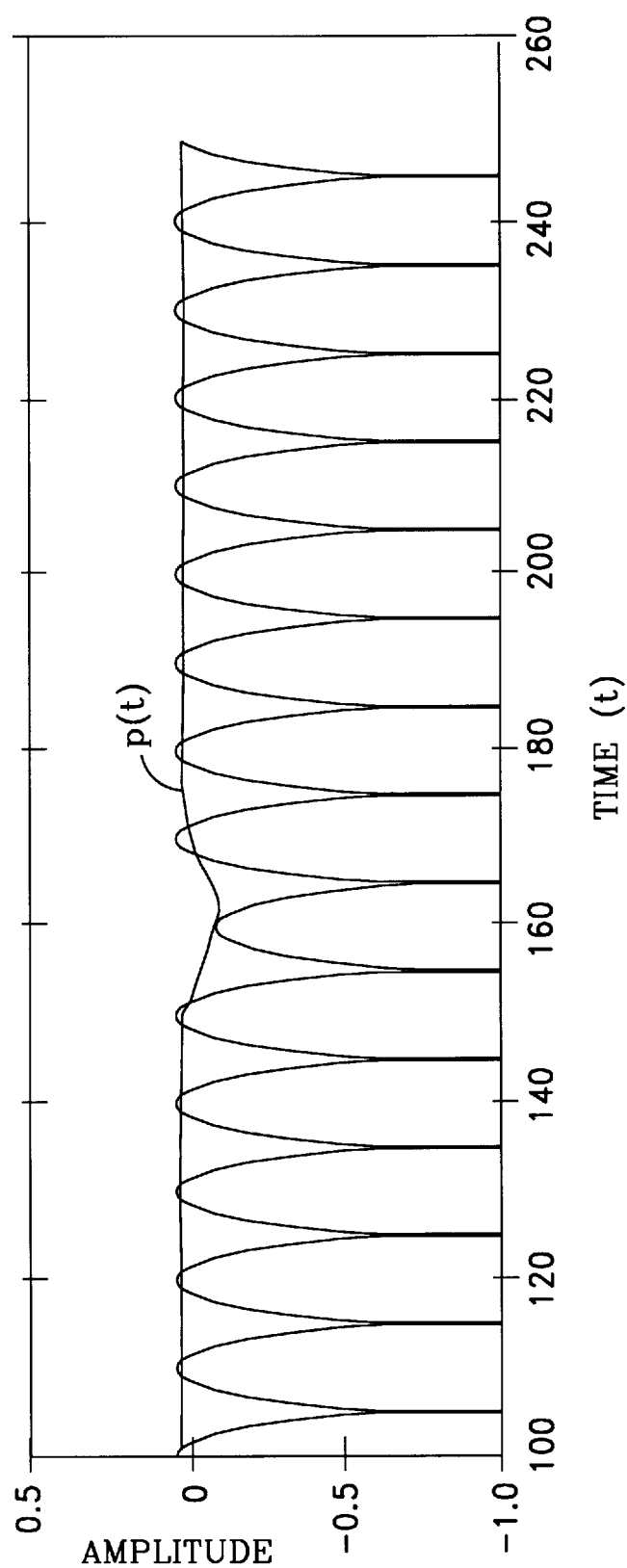
FIG. 5 is a graph showing the logarithmic squared read signal of FIG. 4 upon filtering by a wide band filter and a low pass filter.

4), which is provided to a wide band filter 20 and a low pass filter 22 having a narrow pass band. A typical example of the wide band filter 20 is that produced by Silicon Systems under the part designation 32F8001 U4. An example of the low pass filter 22 is an integrator with a time constant of RC, where R is resistance and C is capacitance. The wide band filter 20 provides a filtered logarithmic squared signal p(t) as shown in FIG. 5, where $$p(t) = \int_{t-T}^{t} dt\, e(t).$$

The squared logarithmic read signal is then provided as one input to each of n comparators, 24a, 24b, . . . , 24n. The logarithmic squared signal generated by the logarithmic amplifier 18 is also received by the low pass filter 22, which generates a reference signal q(t) in response. The reference signal q(t) is the average of the peaks of the logarithmic squared signal l(t) shown in FIG. 4. The reference signal q(t) is provided to a digital-to-analog converter (DAC) 26, which in turn generates n scaled reference signals q1(t), q2(t), . . . , qn(t), as shown in FIG. 7, each of which is provided to the second input of the comparators 24a, 24b, . . . , 24n respectively. It should be understood that the number n comparators 24a, 24b, . . . ,24n may be selected, in accordance with the accuracy requirements of the tester 10. The output of the DAC 26 may be expressed as follows:

$$q'(t) = \frac{1}{2^n} \cdot k \cdot q(t)$$

where n is the number of bits utilized in the DAC 26 such that $0<k<2^n-1$ and where q'(t) is the signal generated by the DAC 26. Typical examples of q'(t) include the following: q1(t)=0.9 q(t), q2(t)=0.8 q(t) and q3(t)=0.7 q(t) . These reference signals q1(t) , q2(t), . . . , qn(t) are used as error thresholds.

The comparators 24a, 24b, . . . , 24n, each compare the signal p(t) to the reference signals q1(t) , q2(t), . . . , qn(t) respectively. If p(t) falls below any one of the three reference signals, one or more n comparators 24a, 24b, . . . , 24n will generate an output, indicating the occurrence of a defect. The outputs of the comparators 24a, 24b, . . . , 24n are provided to an encoder 28, which generates an error signal e(t) when one or more of the comparators 24a, 24b, . . . , 24n generates an output.

The logarithmic disk certification system 10 of the present invention may also be implemented using a rectifier instead of the squarer 16. In this case, the input signal y(t) is rectified before being provided to the logarithmic amplifier 18. With this implementation, the slope of the logarithmic system 10 is given by:

$$(S_{log}) = \frac{d}{dx} \log(x)$$
$$= \frac{1}{x.1n(10)}$$

Thus, where x is in the range $0.1 \leq x \leq 1$, the slope of the response for the logarithmic system is $-4.34 \leq S(x)_{log} \leq -0.434$.

Through implementing the present invention, one may obtain a disk certification tester which provides considerably lower noise bandwidth. In addition, the dynamic range requirements of the processing electronics have been compressed by a logarithmic measure. Furthermore, in the embodiment where the function l(t) is generated by the squared version of y(t), only half the electronics are required in order to process the signal.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. An apparatus for testing a read signal generated by a magnetic head that senses a magnetic field of a magnetic disk, wherein the read signal has a varying amplitude, comprising:

a squarer which receives and squares the read signal;

a logarithmic amplifier coupled to the squarer for converting the squared read signal to a logarithmic read signal;

a first filter coupled to the logarithmic amplifier;

a second filter coupled to the logarithmic amplifier for providing an average signal representative of an average of a predetermined number of peak values of the read signal;

a digital-to-analog converter coupled to the second filter for scaling the average signal to provide a threshold signal; and a comparator having a first input and a second input, the first input being coupled to the first filter, the second input being coupled to the digital-to-analog converter, the comparator providing an output signal in response to receiving a logarithmic read signal from the first filter having an amplitude lower than the threshold signal.

2. The apparatus of claim 1, further comprising a second comparator having a first input a second input and an output, the first input of the second comparator being coupled to the first filter, the second input of the second comparator being coupled to the digital-to-analog converter, the digital-to-analog converter for scaling the average signal to provide a second threshold signal, the second comparator providing an output signal in response to receiving a logarithmic read signal from the first filter having an amplitude that is lower than the second threshold signal.

3. The apparatus of claim 2, further comprising an encoder coupled to the first comparator and the second comparator.

4. The apparatus of claim 1, wherein the first filter is a wide band low pass filter.

5. The apparatus of claim 1, wherein the second filter is a narrow band low pass filter.

6. An apparatus for testing a read signal having a varying amplitude, generated by a magnetic head that senses a magnetic field of a magnetic disk, comprising:

a first circuit for generating a logarithmic read signal corresponding to the square of the read signal; and a comparator having a first input and a second input, the first input being coupled to the first circuit, the second input being coupled to receive a threshold signal, the comparator providing an output signal in response to receiving a logarithmic squared read signal from the first circuit having an amplitude that is lower than the threshold signal.

7. The apparatus of claim 6, further comprising:

a filter coupled to the first circuit and a digital-to-analog converter coupled to the filter, wherein the digital-toanalog converter provides the threshold signal based on an average of a predetermined number of peak values of the read signal.

8. The apparatus of claim 7, further comprising a second comparator having a first input and a second input, the first input of the second comparator being coupled to the first circuit, the second input of the second comparator being coupled to the digital-to-analog converter for providing a second threshold signal based on a second average of a predetermined number of peak values of the read signal, the second comparator providing an output signal if the logarithmic read signal has an amplitude that is lower than the second threshold signal.

9. The apparatus of claim 8, further comprising an encoder coupled to the first comparator and the second comparator.

10. The apparatus of claim 7, wherein the first circuit comprises a wide band low pass filter and wherein the filter is a narrow band low pass filter.

11. A method for testing a signal having a varying amplitude, the signal being generated by a magnetic head that senses a magnetic field of a magnetic disk, comprising the steps of:

(a) squaring the signal;

(b) converting the squared signal to a logarithmic signal;

(c) filtering the logarithmic squared signal; and (d) comparing the filtered logarithmic squared signal to a threshold signal and providing an output signal if said filtered logarithmic signal has an amplitude that is lower than the amplitude of the threshold signal.

12. The method of claim 11, further comprising the steps of:

providing an average of the logarithmic signal; and multiplying the average with a constant to provide the threshold signal.

13. The method of claim 11, further comprising the step of comparing the filtered logarithmic signal to a second threshold signal and providing a second output signal if said filtered logarithmic signal has an amplitude that is lower than the amplitude of the second threshold signal.

14. The method of claim 13, further comprising the step of providing an encoded signal in response to the steps of comparing, the encoded signal being representative of the amplitude of the logarithmic signal.

15. A method for testing a signal having a varying amplitude, the signal being generated by a magnetic head that scans a magnetic field of a magnetic disk, comprising the steps of:

(a) providing a logarithmic signal corresponding to the read signal;

(b) providing a threshold signal based on an average of a predetermined number of peak values of the logarithmic signal;

(c) comparing the logarithmic signal to the threshold signal; and (d) providing an output signal if the logarithmic signal has an amplitude that is lower than the amplitude of the threshold signal.

16. The method of claim 15, wherein step (b) comprises the step of:

providing an average signal based on an average of a predetermined number of peak values of the logarithmic signal; and multiplying the average signal with a constant to provide the threshold signal.

17. The method of claim 15, further comprising the steps of:

filtering the logarithmic signal after step (a); and comparing the filtered logarithmic signal to a second threshold signal to provide a second output signal if said filtered logarithmic signal has an amplitude that is lower than the amplitude of the second threshold signal.

18. The method of claim 17, further comprising the step of providing an encoded signal in response to the steps of comparing, the encoded signal being indicative of the amplitude of the logarithmic signal.

19. An apparatus for testing a read signal generated by a magnetic head that senses a magnetic field of a magnetic disk, wherein the read signal has a varying amplitude, comprising:

a rectifier which receives and rectifier the read signal;

a logarithmic amplifier coupled to the rectifier for converting the rectified read signal to a logarithmic read signal;

a first filter coupled to the logarithmic amplifier;

a second filter coupled to the logarithmic amplifier for providing an average signal representative of an average of a predetermined number of peak values of the read signal;

a digital-to-analog converter coupled to the second filter for scaling the average signal to provide a threshold signal; and a comparator having a first input and a second input, the first input being coupled to the first filter, the second input being coupled to the digital-to-analog converter, the comparator providing an output signal in response to receiving a logarithmic read signal from the first filter having an amplitude lower than the threshold signal.

20. The apparatus of claim 19, further comprising a second comparator having a first input a second input and an output, the first input of the second comparator being coupled to the first filter, the second input of the second comparator being coupled to the digital-to-analog converter, the digital-to-analog converter for scaling the average signal to provide a second threshold signal, the second comparator providing an output signal in response to receiving a logarithmic read signal from the first filter having an amplitude that is lower than the second threshold signal.

* * * * *